United States Patent
Hostettler et al.

(10) Patent No.: US 12,485,228 B2
(45) Date of Patent: Dec. 2, 2025

(54) DOSING SYSTEM FOR AN INJECTION DEVICE

(71) Applicant: Ypsomed AG, Burgdorf (CH)

(72) Inventors: Patrick Hostettler, Hasle (CH); Simon Scheurer, Bern (CH); Jürg Hirschel, Bern (CH)

(73) Assignee: Ypsomed AG, Burgdorf (CH)

( * ) Notice: Subject to any disclaimer, the term of this patent is extended or adjusted under 35 U.S.C. 154(b) by 1040 days.

(21) Appl. No.: 17/513,318

(22) Filed: Oct. 28, 2021

(65) Prior Publication Data

US 2022/0047817 A1 Feb. 17, 2022

Related U.S. Application Data

(63) Continuation of application No. PCT/EP2020/062384, filed on May 5, 2020.

(30) Foreign Application Priority Data

May 7, 2019 (EP) ..................................... 19173016

(51) Int. Cl.
*A61M 5/315* (2006.01)

(52) U.S. Cl.
CPC .... *A61M 5/31551* (2013.01); *A61M 5/31541* (2013.01); *A61M 5/31583* (2013.01);
(Continued)

(58) Field of Classification Search
CPC .......... A61M 5/31551; A61M 5/31541; A61M 5/31583; A61M 2005/3154;
(Continued)

(56) References Cited

U.S. PATENT DOCUMENTS

2015/0051551 A1* 2/2015 Hirschel ............ A61M 5/3156
604/207

FOREIGN PATENT DOCUMENTS

EP 2918298 A1 9/2015
EP 2221077 B1 8/2016
(Continued)

OTHER PUBLICATIONS

International Preliminary Report on Patentability received for International Application No. PCT/EP2020/062384 mail on Nov. 2, 2021, 7 pages.

*Primary Examiner* — Dung T Ulsh
*Assistant Examiner* — Nelson Louis Alvarado, Jr.
(74) *Attorney, Agent, or Firm* — Dorsey & Whitney LLP

(57) ABSTRACT

An injection device for dispensing a dose of a product by manually advancing a piston rod includes a dosing and dispensing mechanism having a housing with a longitudinal axis, a dosing sleeve mounted in the housing for adjusting and correcting the dose, a housing insert fixed to the housing and arranged inside the dosing sleeve, and a coupling sleeve mounted in the housing for driving the piston rod. For setting and correcting a dose, the dosing sleeve is rotatable relative to the coupling sleeve, and for dispensing the dose, the dosing sleeve can be coupled to the coupling sleeve in a rotationally fixed manner. In this case, the coupling sleeve has a locking element which can interact with the housing insert so that the coupling sleeve can be rotated in a first direction of rotation and cannot be rotated in a second direction of rotation relative to the housing insert.

20 Claims, 5 Drawing Sheets

(52) U.S. Cl.
CPC ............... *A61M 2005/3154* (2013.01); *A61M 2205/581* (2013.01); *A61M 2205/582* (2013.01)

(58) Field of Classification Search
CPC ...... A61M 2205/581; A61M 2205/582; A61M 5/3155; A61M 5/3151; A61M 5/31553; A61M 5/31555
See application file for complete search history.

(56) References Cited

FOREIGN PATENT DOCUMENTS

| | | |
|---|---|---|
| EP | 3520844 A1 | 8/2019 |
| EP | 3708206 A1 | 9/2020 |
| WO | 2009150028 A1 | 12/2009 |
| WO | 2010149209 A1 | 12/2010 |
| WO | 2011068531 A1 | 6/2011 |
| WO | 2020225238 A1 | 11/2020 |

* cited by examiner

DOSING SYSTEM FOR AN INJECTION DEVICE

CROSS REFERENCE TO RELATED APPLICATIONS

This application claims priority to International Patent Application No. PCT/EP2020/062384, filed May 5, 2020, entitled "DOSING SYSTEM FOR AN INJECTION DEVICE," which in turn claims priority to European Patent Application No. 19173016.7, filed May 7, 2019, entitled "DOSING SYSTEM FOR AN INJECTION DEVICE", each of which is incorporated by reference herein, in the entirety and for all purposes.

TECHNICAL FIELD

Implementations relate to the field of medical injection devices for the administration of liquid substances, in particular drugs or medical substances such as insulin and hormone preparations, and more specifically relate to injection devices including dosing and dispensing mechanisms.

BACKGROUND

Known injection devices typically include a drive sleeve and/or a coupling sleeve for driving a plunger rod to dispense the liquid substance from a cartridge or a product container, a dosing element for setting a dose to be administered, a dispensing button, and a coupling mechanism for selectively coupling the dosing element to the drive sleeve or coupling sleeve.

To set a dose, the user turns or pulls on the dosing element, which then unscrews or moves out of the injection device housing. To allow the set dose to be dispensed, the user pushes on the dispensing button at a proximal end of the injection device, thereby generating a force in the distal direction, causing the dosing element to screw or slide into the housing. In contrast to setting a dose, during dose dispensing the dispensing element transmits the rotary or sliding movement to the drive sleeve or coupling sleeve, which thereby drives the piston rod to dispense the dosed substance from the cartridge. Depending on the configuration, the piston rod can be rotated or screwed or can only be slid relative to the housing.

To correct a dose that has been accidentally set too high, the user can rotate or slide the dosing element back into the housing. During this corrective action, as well as during handling of the injection device between administrations, it must be ensured that the position of the plunger rod cannot be unintentionally shifted relative to the cartridge, in particular it must be ensured that the plunger rod does not move away from the cartridge.

One way of preventing unintentional shifting is to use a so-called reverse rotation lock or anti-rotation lock. This either directly prevents the piston rod from rotating against the direction of rotation for dispensing the substance, or the anti-rotation lock engages the driving element, so that a reverse movement of the piston rod is indirectly prevented.

EP 2 221 077 B1 describes an injector including a housing which contains a sleeve-shaped housing insert fixed to the housing. On the outside, this comprises a thread in which a dosing sleeve engages. Inside, a rotatable piston rod is arranged, which is also in threaded connection with the housing. Furthermore, the injector comprises a coupling sleeve, which is located between the piston rod and the housing insert. To set a dose, the dosing sleeve is unscrewed from the housing relative to the housing. The coupling sleeve does not rotate in the process, as it is coupled to the piston rod in a rotationally fixed manner. The piston rod is held by ratchet elements. The ratchet elements are located on the housing and are arranged in the area where the piston rod is screwed into the housing. They allow rotational movement of the piston rod relative to the housing in a discharge direction and block rotation in an opposite direction. For discharge, the dosing sleeve is coupled to the coupling sleeve by actuating a discharge button, and the dosing sleeve and coupling sleeve are screwed back into the housing. Since the piston rod is connected to the coupling sleeve so that it cannot rotate, the coupling sleeve is rotated in the discharge direction, allowing the product to be discharged.

The ratchet elements interacting with the piston rod are arranged directly on the housing and are located in an axial section which is connected distally to the coupling sleeve. This makes the injection device longer.

SUMMARY

Implementations provide an injection device which can be constructed in a compact manner.

This objective is solved by providing an injection device and a dosing and dispensing mechanism according to the claims.

According to implementations, an injection device for dispensing a dose of a product by manual advancement of a piston rod into a cartridge held in the injection device includes a dosing and dispensing mechanism. This dosing and dispensing mechanism may include a housing having a longitudinal axis, a dosing sleeve that may be mounted in the housing for adjusting and correcting the dose, a housing insert, which may be fixed to the housing and located within the dosing sleeve, and a coupling sleeve that may be mounted in the housing for driving the piston rod. For setting and correcting a dose, the dosing sleeve may be rotated relative to the coupling sleeve, and for dispensing the dose, the dosing sleeve may be coupled to the coupling sleeve in a rotationally fixed manner. In this case, the coupling sleeve may include a locking element for interacting with the housing insert in such a way that the coupling sleeve may be rotated in a first direction of rotation relative to the housing insert and may be prevented from being rotated in a second direction of rotation relative to the housing insert.

By the coupling sleeve including the locking element and, on the other hand, the dosing and dispensing mechanism including a housing insert with which the locking element can cooperate, a compact design of the injection device may be provided. As a result, the housing insert arranged inside the dosing sleeve may enable the locking element to be held inside the injection device on an element fixed to the housing or cooperable therewith. As a result, the locking element may, for example, be arranged directly on an outer side of the coupling sleeve or be integrated into the coupling sleeve. The locking element may not need to be provided proximally or distally adjacent to the coupling sleeve or in an additional element to prevent unwanted rotation of the piston rod. Furthermore, a locking element arranged on the coupling sleeve also may not necessarily need to be arranged at a distal or a proximal end of the coupling sleeve, which may otherwise require additional space to be able to interact with the housing. For instance, the locking element may be arranged at any axial position of the coupling sleeve, which may allow for a more compact design of the dosing and dispensing mechanism, such as a shorter design.

The injection device may include a cartridge containing a medicinal substance. To dispense the product from the cartridge, the piston rod of the injection device may be used, for example, to displace a stopper in the cartridge in a dispensing direction in the distal direction. This discharge direction may be parallel to the direction of the longitudinal axis of the housing.

The injection device may be configured as a disposable injection device, which may be disposed of or recycled after the contents of the cartridge have been dispensed. In an alternative configuration, however, it may also be possible for the injection device to be designed as a reusable injection device. In this case, the cartridge may be removed from the injection device and a new cartridge inserted by means of a detachable connection of a cartridge holder to the housing or by means of a multi-part housing.

The dosing and dispensing mechanism may contain a housing in which the dosing sleeve, the coupling sleeve and the piston rod may be arranged. In this regard, this housing may simultaneously form an outer housing of the injection device or, alternatively, the injection device may comprise an additional housing structure. In this case, the housing of the dosing and dispensing mechanism may be arranged within the outer housing structure of the injection device.

The housing may contain a housing insert, which may for example be in the form of a sleeve or a half-shell and may be arranged coaxially to the central longitudinal axis of the housing. The housing insert may support the dosing sleeve, such as by means of a threaded connection. Furthermore, the housing insert may guide or support further elements such as, for example, the coupling sleeve.

The dosing sleeve may be used to set and correct a dose. For this purpose, the dosing sleeve may be moved relative to the housing. The dosing sleeve may be rotatable or rotatable and displaceable relative to the housing. For example, for dosing, the dosing sleeve may be screwed out of the housing by means of a screwing movement, e.g., by rotation and displacement. Alternatively, the dosing sleeve may be mounted to be linearly displaceable relative to the housing. In this case, the dosing sleeve may be pulled out of the housing, for example, with a pulling movement in order to set a dose. For instance, the dosing sleeve may be annular or sleeve-shaped. In some examples, such a dosing sleeve may be arranged in the housing coaxially to the longitudinal axis of the housing. In this case, the dosing sleeve may enclose the housing insert, so that the dosing sleeve is arranged in an annular gap between an inner side of the outer housing and the outer side of the housing insert, viewed radially.

The coupling sleeve may be used to couple the dosing sleeve to the piston rod when the dose is dispensed, for instance to couple the dosing sleeve rotationally. In addition, the coupling sleeve may drive the piston rod directly or indirectly via another element such as a drive sleeve. For instance, the coupling sleeve may cooperate directly with the piston rod to drive the piston rod. The piston rod may be driven into the cartridge so that the product can be discharged from the cartridge. In this case, the piston rod may be rotated by the coupling sleeve or another element so that the piston rod moves in a distal direction, for example, by a screw movement. Alternatively, the piston rod may only be displaced by the coupling sleeve or another element and may be guided in the housing in a rotationally fixed manner.

When setting and correcting a dose, the coupling sleeve may not be rotated, but may only be displaced axially relative to the housing. To dispense a set dose, a force applied manually by the user may move the coupling sleeve and the dosing sleeve coupled to the coupling sleeve back into the housing, for instance by means of a screwing movement into the housing. The force may be applied either directly by the user to the coupling sleeve or indirectly via another element, such as a dispensing button. The term "manual" means that no other energy, such as a force from a preloaded spring, is used to dispense the dose. The force to advance the piston rod to dispense the product may thus be applied only by the user.

The locking element may cooperate with the housing insert so that the coupling sleeve may rotate relative to the housing insert in a first direction and may be prevented from rotating or may be locked in a second direction opposite to the first direction. In some implementations, the locking element may be formed as a pawl element or as a counter-pawl element to the pawl element. The pawl element may thereby cooperate with the counter-pawl element, forming a ratchet (also called a locking mechanism).

In some implementations, either the coupling sleeve may include a pawl element while the housing insert includes a mating pawl element, or the coupling sleeve may include the mating pawl element while the housing insert includes the pawl element; the pawl element and mating pawl element may interact as a ratchet such that the coupling sleeve may be rotated relative to the housing insert in a dispensing direction and may not be rotated or may be blocked in an opposite direction or dosing direction. In this case, the opposite direction or dosing direction may be opposite to the dispensing or discharge direction.

The pawl element may be, for example, an arm, cam, tooth, or other projection that may cooperate with the mating pawl. However, the pawl element may not a be a separate component, but may be connected to the coupling sleeve or housing insert in one piece or in several pieces, or may be formed integrally with the coupling sleeve or housing insert. The mating locking piece may be formed by teeth, projections or recesses in the housing insert or in the coupling sleeve. The mating locking piece may be formed integrally in the housing insert or in the coupling sleeve, or the mating locking piece may be a separate component.

In the present disclosure, the term "distal" refers to a side or direction directed toward the front, insertion end of the injection device or toward the tip of the injection needle. In contrast, the term "proximal" refers to a side or direction directed toward the rear end of the injection device opposite the piercing end.

The term "axial" refers to the longitudinal axis of the housing. Accordingly, an axial direction is parallel to the longitudinal axis of the housing or in the longitudinal direction of the housing. A "radial direction" refers to a direction perpendicular to the longitudinal axis of the housing.

As used herein, the term "product", "drug", or "medical substance" includes any flowing medical formulation suitable for controlled administration by means of a cannula or hollow needle into subcutaneous or intramuscular tissue, for example, a liquid, solution, gel, or fine suspension containing one or more active medical ingredients. As a result, a drug may be a composition containing a single active ingredient or a premixed or co-formulated composition containing multiple active ingredients from a single container. In particular, the term includes drugs such as peptides (e.g., insulins, insulin-containing drugs, GLP 1-containing drugs, and derived or analogous preparations), proteins, hormones, biologically derived agents, active agents, hormone- or gene-based agents, nutritional formulations, enzymes, and other substances both in solid (suspended) or liquid form. The term further includes polysaccharides, vaccines, DNA or RNA or oligonucleotides, antibodies or parts of antibodies, and suitable base, auxiliary and carrier sub stances.

As used herein, the terms "injection device" or "injector" refer to a device in which the injection needle is removed from the tissue after a controlled amount of the medical substance has been delivered. As a result, in an injection system or in an injector, as opposed to an infusion system, the injection needle may not remain in the tissue for an extended period of several hours.

By "disposable injection device", which is also referred to as a "disposable injector", is meant a device which is disposed of after one or more injection procedures, but at the latest after the last dispensable dose. The cartridge of such a disposable injection device may not be replaceable. In contrast, in the case of reusable injection devices, the cartridge used may be replaced once the product has been completely dispensed from it. In such reusable injection devices, when the cartridge is replaced, the piston rod may be pushed back into the housing in a proximal direction so that the piston rod is again ready to dispense product from the new cartridge.

According to implementations, the locking element may be an elastic radial arm. In this regard, at least a portion of the arm may engage a mating element inside the housing insert to allow rotation of the coupling sleeve in one direction and block rotation in the opposite direction. Thus, a simple and compact mechanism can be provided which may control the direction of rotation of the coupling sleeve. The radial arm may be immovably connected to the coupling sleeve at a first end. The second, free end of the radial arm, may cooperate with the housing insert. For this purpose, the radial arm may include an engagement area at a free end. For instance, the radial arm may be arranged in a central region of the coupling sleeve with respect to the axial length of the coupling sleeve.

Alternatively, it may also be possible for the locking element to be configured not as an arm but, for example, as a cam, tooth or ratchet element.

The sleeve shape of the coupling sleeve may be formed by an outer surface, and the arm may be formed in this outer surface of the coupling sleeve. For instance, the radial arm may be integrated in this shell surface, so that the radial arm is connected to the coupling sleeve at one end and may be moved elastically and flexibly relative to the shell surface at its other, free end. As a result, the radial arm may be designed to be space-saving, since the radial arm does not have to be placed at a distal or proximal end of the coupling sleeve, but can be integrated into its lateral surface in a space-saving manner.

In some implementations, the arm may be formed in one piece with the coupling sleeve. This may allow the number of components to be reduced, which may simplify assembly.

The housing insert may include grooves aligned in the direction of the longitudinal axis with which the locking element may cooperate. The grooves may be formed inside the housing insert, such as on an inner surface of a sleeve- or shell-shaped portion of the housing insert.

In some implementations, the grooves and/or a part of the locking element may be asymmetrically shaped in cross-section so that the locking element in the form of an arm, cam or projection may be moved in one direction over the grooves and engage in the grooves when moved in the opposite direction and may thus block a relative movement between the coupling sleeve and the housing insert. For example, the grooves may be shaped such that there are saw tooth-shaped elements in cross-section between the grooves which allow the locking element to pass in one direction and block it in the opposite direction.

Alternatively, it may also be possible for the housing insert to have no grooves but instead a counter element, such as individual asymmetrically shaped teeth or projections, which may interact with the blocking element.

The housing insert may include a thread on its outer sides with which the dosing sleeve may be in a threaded engagement. In this case, the dosing sleeve may be positioned radially between an inner wall of an outer housing sleeve and an outer side of the housing insert. This may allow the dosing sleeve to be arranged in the injection device in a space-saving manner. Since the dosing sleeve has the thread on its inner side, no thread may be required on the outer side, whereby display elements such as a numerical scale may be arranged in an easily readable manner.

The coupling sleeve may include an elastic click element which may cooperate with the dosing sleeve when setting a dose and correcting a dose in a first direction of rotation (dispensing direction) as well as in a second direction of rotation (dosing direction) to generate an acoustic and/or tactile signal. The click element may thus generate a signal for both directions of rotation and it may not be necessary to use two elements, e.g., one element for each direction of rotation, as is common in the prior art. This may be made possible, for example, by the shape of the click element having a rounded free end. For example, the click element may be an elastic arm, tooth or slider. The click element may be moved over cams, grooves or teeth of the dosing sleeve, whereby the acoustic and/or tactile signal may be generated, for example, in the form of a click and/or a vibration.

Furthermore, the coupling sleeve may be mounted rotationally fixed but displaceable relative to the piston rod and may also be mounted directly on the piston rod. This may allow the coupling sleeve to be displaced relative to the piston rod when setting and correcting a dose. If the piston rod is mounted rotatable relative to the housing, the piston rod may be rotated by the rotationally connected coupling sleeve during dispensing. For instance, the piston rod may be in a threaded engagement with the housing such that the piston rod screws distally through the housing during dispensing.

In this case, the coupling sleeve may include at least one axial web pointing radially inwards on the inside. That is, the web may be arranged on the inner side of the coupling sleeve, with the height of the web facing the center of rotation of the coupling sleeve. The piston rod may include a corresponding groove in which the web may engage. If the piston rod has an external thread, this may be interrupted by the groove. By means of the connection with the web and the groove, the coupling sleeve may be securely and reliably coupled rotationally with the piston rod but may nevertheless be mounted so as to be displaceable in the direction of the longitudinal axis relative to the piston rod.

In a further implementation, the coupling sleeve may be designed in two parts. In this case, the coupling sleeve may include a first part which may cooperate with the piston rod and a second part which may be coupled to the dosing sleeve, the first part and second part may be mounted so as to be displaceable relative to one another and rotationally fixed or connected to one another.

Thereby, the first part may be axially fixed but mounted rotatable on the housing or on the housing insert. The second part may be displaceable in the direction of the longitudinal axis relative to the first part. This may allow the second part of the coupling sleeve and the dosing sleeve to be moved together out of the housing when adjusting and correcting a dose as the dosing sleeve is moved relative to the housing. The second part may remain rotationally fixedly coupled to the first part, which may not move longitudinally. This may ensure that the first part can always interact with the piston rod. This means that the piston rod may not need to be constructed particularly long, since the first part does not move axially. In the case of a one-piece piston rod, there may be a risk that the coupling sleeve will move away from the piston rod when a dose is set, so that it can no longer drive the piston rod.

In some implementations, the locking element may be located on the second part of the coupling sleeve so that the locking sleeve may interact with the housing insert. Where the coupling sleeve includes an elastic click element for generating an acoustic and/or tactile signal, the elastic click element may be arranged on an outer side of the second part of the coupling sleeve to enable cooperation with the dosing sleeve.

In this case, the first part may be displaceable and rotationally fixedly mounted on the piston rod relative to the piston rod. Furthermore, the first part may be sleeve-shaped and arranged coaxially in the second part, which may also be sleeve-shaped, so that the second part surrounds the first part. Such an arrangement may provide for a space-saving design.

If the coupling sleeve has an axial web on the inside, this web may be formed inside the first sleeve-shaped part, so that the web may engage with any axial groove present in the piston rod.

BRIEF DESCRIPTION OF THE DRAWINGS

In connection with the attached figures, implementations of the present disclosure are described herein and are intended to show basic possibilities and are in no way to be construed restrictively.

DETAILED DESCRIPTION

Figure 1:
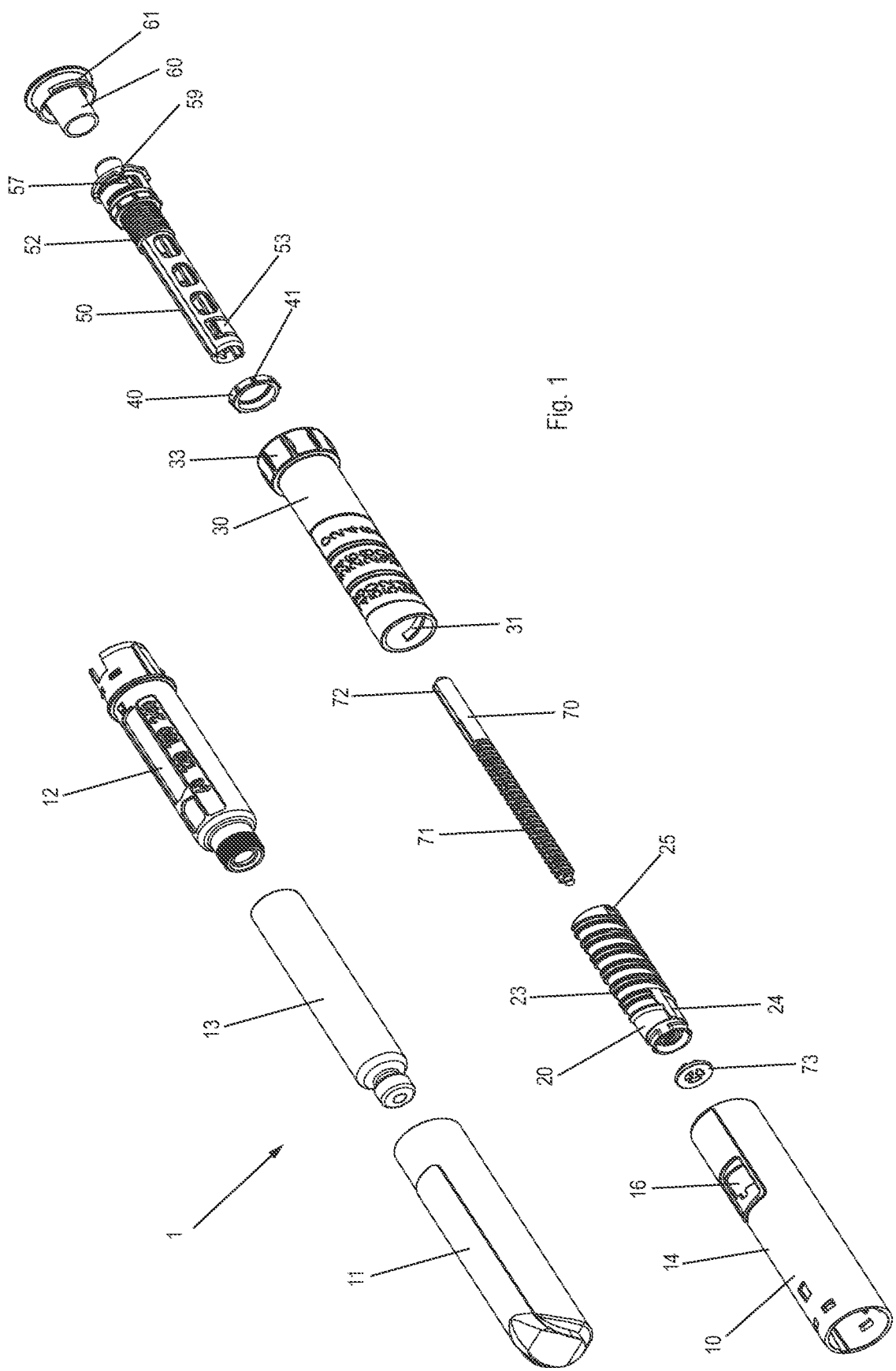
FIG. 1 shows an isometric, exploded view of an injector with a dosing and dispensing mechanism, according to the present disclosure.

FIG. 1 shows an exploded view of an injection device with a dosing and dispensing mechanism according to the present disclosure. Here, the distal, piercing end of the injector 1 is located in the left, lower region of FIG. 1 and the proximal end of the injector 1 is located in the right, upper region of FIG. 1.

In FIG. 1, the injector 1 may be configured as a disposable injector. As can be seen in FIG. 1, the injector 1 includes a removable protective cap 11, an elongated cylindrical housing 10 which may also form the housing of the dosing and dispensing mechanism, and a cartridge holder 12 in which a cartridge 13 containing a medical substance may be held. Further, the injector 1 may include the dosing and dispensing mechanism of the present disclosure. This may include the housing 10 which may include an outer housing sleeve 14 and a housing insert arranged inside the outer housing sleeve 14 which may be in the form of an inner housing sleeve 20, a dosing sleeve 30 for setting and correcting a dose, a coupling sleeve 50, a stop nut 40, which may be in threaded engagement with the coupling sleeve 50, a dispensing button 60 for initiating dispensing, and a piston rod 70 which may be disposed within the coupling sleeve 50 and may be drivable by the coupling sleeve 50 for dispensing the medical substance from the cartridge 13.

The structural features of the individual components of the injector 1 are discussed in detail as follows. The function, in particular the setting, correction and discharge of a dose, is described thereafter.

The cartridge holder 12 may be snapped to the housing 10 at a distal end of the housing 10 in a rotationally fixed and axially fixed manner by means of a snap-fit connection. The cartridge holder 12 may support the cartridge 13 and may have a connecting element at its distal end to which an injection needle (not shown) may be attached.

The outer housing sleeve 14 may be cylindrical in shape. In a proximal region, a radial aperture or opening 16 may be formed in the jacket of the housing sleeve 14. Through this opening 16, a numerical scale of the dosing sleeve 30 may be read from the outside.

Figure 2:
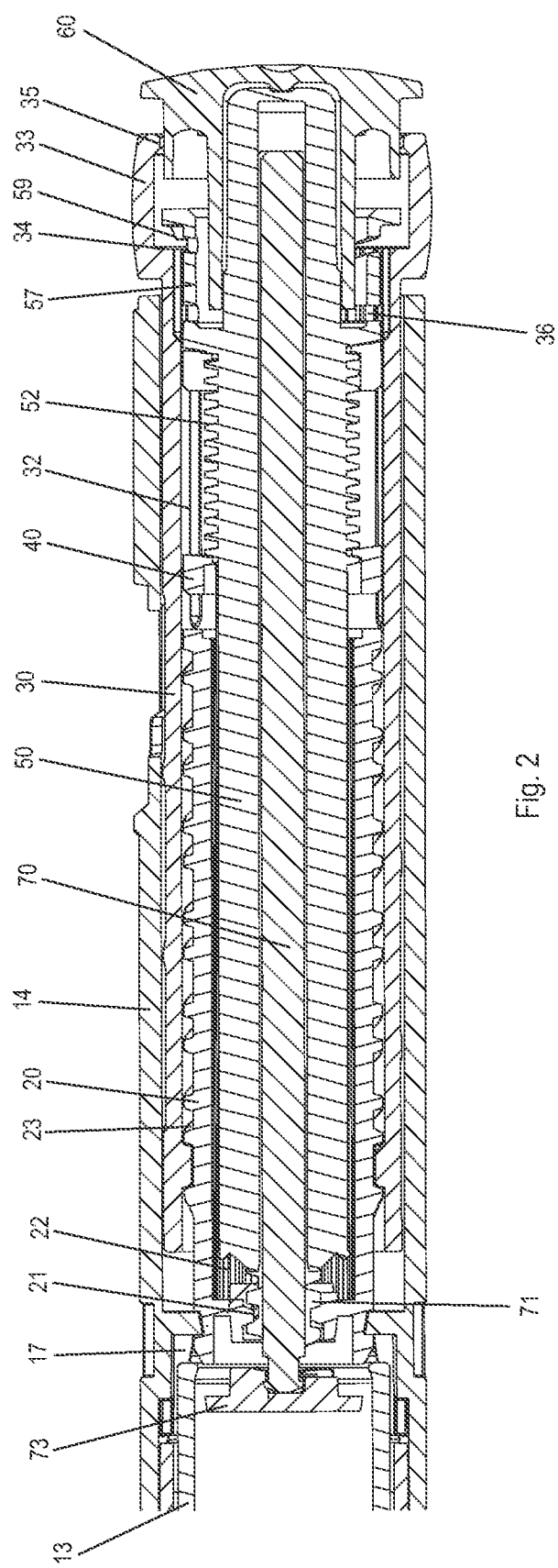
FIG. 2 shows a cross-sectional view of the injector of FIG. 1 in an initial position, with the cross-section passing through the longitudinal axis of the injector.

Furthermore, the outer housing sleeve 14 may include ribs 17 at the distal end on the inner side distributed over the circumference and projecting radially towards the center, for example as shown in FIG. 2. The ribs 17 may have a pitch as viewed in the axial direction, the pitch increasing in the proximal direction. In other words, the ribs 17 may be axially wedge-shaped and may have a smaller radial height distally than proximally, with the radial height increasing steadily in the proximal direction (pitch). The ribs 17 may be thereby dimensioned and/or configured in such a way that they are plastically deformable. The cartridge 13 may first be inserted into the cartridge holder 12. Subsequently, the cartridge holder 12 may be connected to the outer housing sleeve 14 by means of a snap connection. When the cartridge holder 12 is brought together with the housing sleeve 14, the cartridge 13 located in the cartridge holder 12 or a cartridge proximal end outer edge may first contact the ribs 17 at an edge pointing towards the center. If the cartridge holder 12 is pushed further into the housing sleeve 14 in the proximal direction, the ribs 17 may deform plastically. The ribs 17 may thus be permanently shaped by the cartridge 13. In the process, the ribs 17 may either be pushed aside as a whole from their original position or may be shaped in the radial direction and at least partially assume the shape of the outer contour of the cartridge 13. When the cartridge holder 12 is now snapped to the housing sleeve 14, the cartridge 13 may be held axially as well as radially free of play and immobile, since the cartridge holder 12 may exert a clamping force in the proximal direction on the cartridge 13, thereby pressing the cartridge 13 onto the shaped ribs 17.

Figure 3:
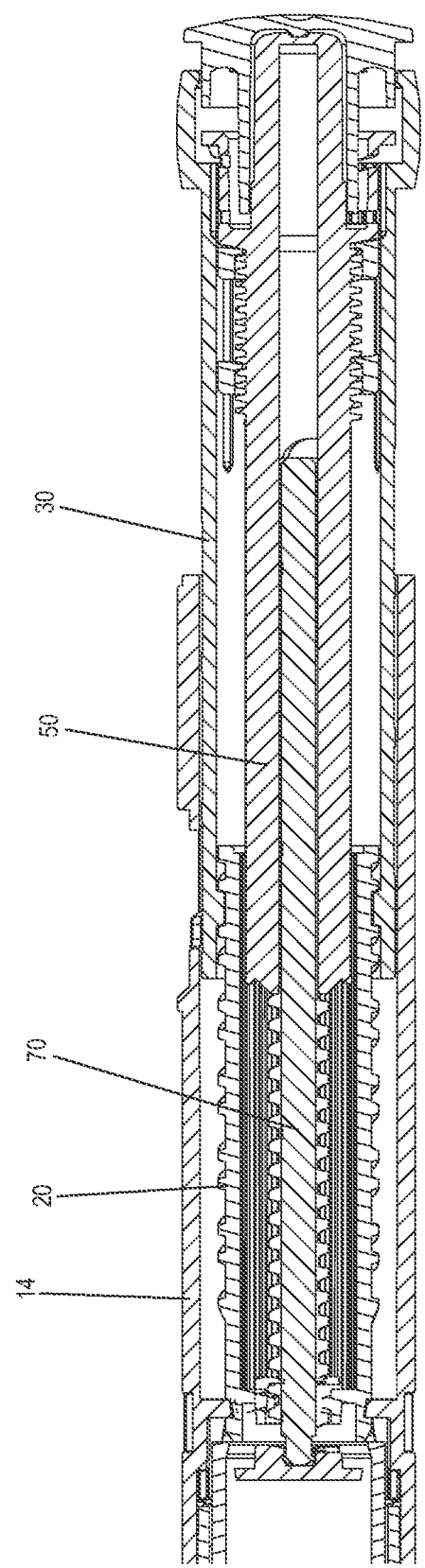
FIG. 3 shows a cross-sectional view of the injector of FIG. 1 after a dose has been set.

The inner housing sleeve 20 may have a cylindrical shape and may be coaxial with the outer housing sleeve 14. By means of catches which engage in a wall on the inside of the outer housing sleeve 14, the inner housing sleeve 20 may be snapped onto the outer housing sleeve 14 both in the axial direction and rotationally immovably relative thereto. In a distal region, such as through an inner base, the inner housing sleeve 20 may include an internal thread 21 in which the piston rod 70 may be screwed in, as shown in FIGS. 2 and 3. Furthermore, the inner housing sleeve 20 may include a plurality of longitudinal grooves 22 aligned in the direction of the longitudinal axis.

On its outer side, the inner housing sleeve 20 may include an external thread 23 onto which the dosing sleeve 30 may be screwed. At the distal end and at the proximal end of the external thread 23, an axially aligned web or shoulder 24, 25 may be formed in each case. In the fully screwed-in position of the dosing sleeve 30, a stop (not shown) in the dosing sleeve 30 may strike the distal web or shoulder 24 so that the minimum dose or screw movement of the dosing sleeve 30 into the housing may be limited by the distal web or shoulder 24. The maximum dose or screw movement of the dosing sleeve 30 out of the housing 10 may be limited by the proximal web or shoulder 25. As a result, the rotatable inner housing sleeve 20 may support the dosing sleeve 30 relative to the housing 10.

The dosing sleeve 30 may be in the form of a hollow cylinder or sleeve and may have an area at the proximal end with a diameter which may be larger than the remaining area of the dosing sleeve 30 and which may serve as a handle 33 for rotating the dosing sleeve 30. This handle 33 may not fit into the housing 10 but, as can be seen in FIG. 2, may abut the proximal end of the outer housing sleeve 14. At the proximal end of the handle 33, an inwardly facing circumferential bead 35 may be formed, also visible in FIG. 2. In addition, a numerical scale (FIG. 1) may be provided on the exterior of the dosing sleeve 30 to indicate to the user the adjustable doses.

As mentioned, the dosing sleeve 30 may be in a threaded connection with the inner housing sleeve 20. For this purpose, the dosing sleeve 30 may include an internal thread 31 on its inner side in a distal region. In a central region, the dosing sleeve 30 may include on its inner side a plurality of axial grooves 32 (FIG. 2) for guiding the stop nut 40. Further, proximal to these grooves 32, radial teeth 36 may be formed circumferentially, which may cooperate with click arms 57 of the coupling sleeve 50, as shown in FIG. 2 and described as follows.

At the transition of the dosing sleeve 30 from the region of the smaller diameter to the region of the larger diameter, e.g., where the handle 33 is formed, an annular surface may be provided inside the dosing sleeve 30 which may be at right angles to the longitudinal axis. On this surface circumferential axial teeth 34 may be arranged, which may be connected to each other by means of a rounded transition.

The hollow, cylindrical, elongated coupling sleeve 50 may include a bore from the distal side. In this bore are two webs 51 which may be offset by 180° in the circumferential direction and may project radially towards the center and extend over the entire axial length of the bore. The web 51 can be seen in FIG. 4.

In addition, the coupling sleeve 50 may include a distal section and a proximal section, with a sleeve-shaped section disposed between the distal and proximal sections. The proximal section may include an external thread 52 in its proximal end portion, in which the stop nut 40 may engage. In addition, flexible, resilient ratchet arms 53 may be formed in the distal section in the lateral surface, which may serve as a locking element or ratchet element. The ratchet arms 53 may be integrated in the lateral surface of the coupling sleeve 50 and thus may have an arcuate shape.

Figure 4:
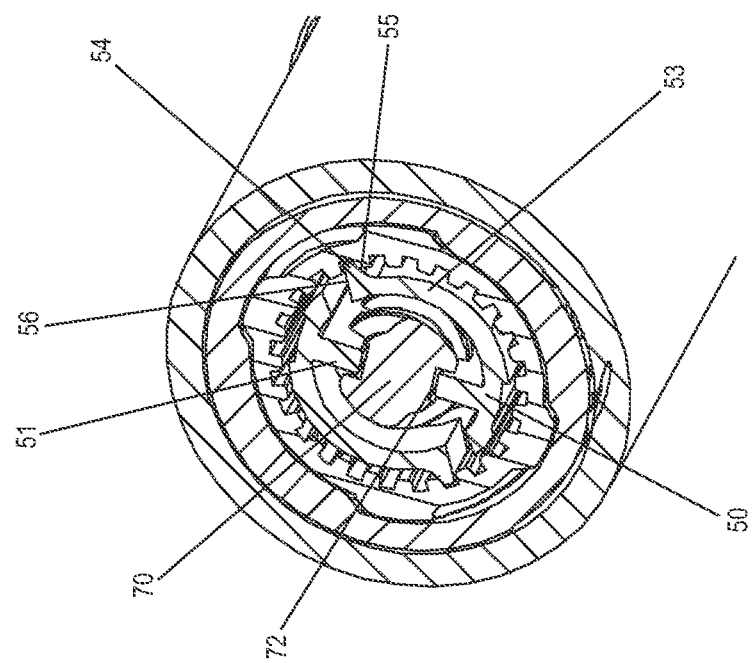
FIG. 4 shows a cross-sectional view through a central region of the injector of FIG. 1, with the cross-section taken perpendicular to the longitudinal axis of the injector.

As can be seen in FIG. 4, the ratchet arms 53 may each have a radially projecting cam 54 at a free end, which may cooperate with a counter locking piece in the form of the longitudinal grooves 22 of the inner housing sleeve 20. In the assembled state, the elastic ratchet arms 53 may be slightly biased radially inward. This may press the ratchet arms 53 into the longitudinal grooves 22 of the inner housing sleeve 20. Cams 54 of the ratchet arms 53 may have a terminating end face 56 at right angles to the longitudinal axis on one side and a rounded area 55 on the other side, which may create a smooth transition from the cam 54 to the arcuate portion of the ratchet arm 53.

When the coupling sleeve 50 is now rotated relative to the inner housing sleeve 20 in a discharge direction, the ratchet arms 53 may each slide over the longitudinal grooves 22 with the rounded region 55. That is, in this direction of rotation, the cam 54 may engage the longitudinal grooves 22 only in a force-fit manner and may slide from one longitudinal groove 22 to the next upon rotation due to the rounded area 55 of the cam 54.

If, on the other hand, the coupling sleeve 50 is rotated in a direction opposite to the direction of discharge relative to the inner housing sleeve 20, the cams 54 may each engage in the longitudinal groove 22. In this direction of rotation, the straight end face 56 of the cam 54 may abut a groove flank of the longitudinal groove 22. Due to the arcuate shape of the ratchet arm 53, further rotation may press the cam 54 deeper or positively into the longitudinal grooves 22, thereby blocking rotation of the coupling sleeve 50 relative to the housing sleeve 20. The ratchet arms 53 may thus allow rotation of the coupling sleeve 50 relative to the inner housing sleeve 20 or housing 10 in the discharge direction, and may prevent rotation in the opposite direction of rotation.

Figure 5:
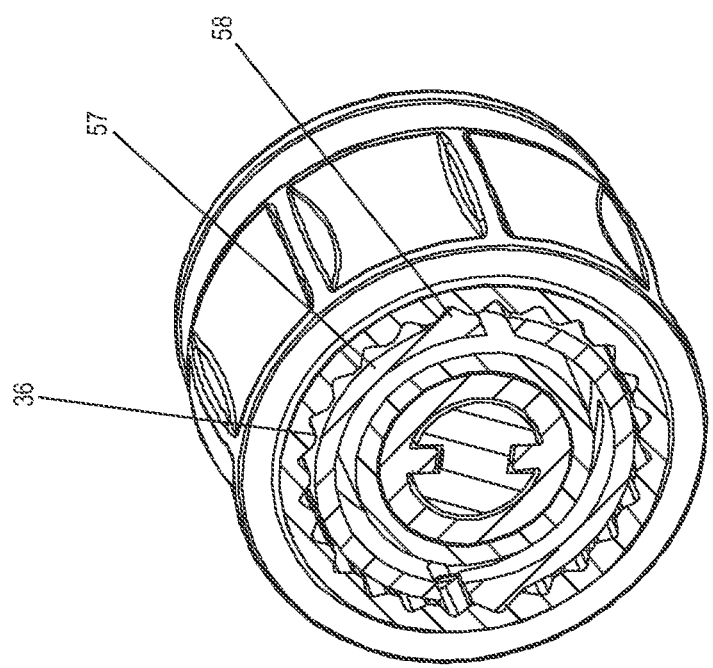
FIG. 5 shows a cross-sectional view in a proximal region of the injector of FIG. 1, with the cross-section being perpendicular to the longitudinal axis of the injector.

The sleeve-shaped section of the coupling sleeve 50 may be axially and rotationally fixed to the coupling sleeve 50. Radial click arms 57 may be formed in the sleeve-shaped section of the coupling sleeve 50 in the lateral surface. As can be seen in FIG. 5, these radial click arms 57 may each have a rounded tooth 58 at the free end, which may cooperate with the radial teeth 36 of the dosing sleeve 30. Further, the sleeve-shaped section of the coupling sleeve 50 may have at the proximal end a radially outwardly pointing collar which may form an annular surface which may be oriented at right angles to the longitudinal axis. On this surface may be circumferentially disposed axial teeth 59 which may be engagable with the axial teeth 34 of the dosing sleeve 30.

The proximal portion of the coupling sleeve 50 may have a smaller diameter than the distal portion and may serve to rotatably support the dispensing button 60. The dispensing button 60 may be supported on the coupling sleeve 50 by a conical bearing surface at the center of the proximal end of the coupling sleeve 50 (FIG. 2). In addition, the dispensing button 60 may include radial webs 61 (FIG. 1) that may engage behind the bead 35 of the dosing sleeve 30, which may thereby hold the dispensing button 60 in the direction of the longitudinal axis relative to the dosing sleeve 30 and the coupling sleeve 50.

As mentioned, the stop nut 40 may be screwed onto the external thread 52 of the coupling sleeve 50. The stop nut 40 may include axially aligned webs 41 on an exterior surface, which may engage in the grooves 32 of the dosing sleeve 30. The stop nut 40 may thus be rotatable relative to the coupling sleeve 50 and axially displaceable but rotationally fixed relative to the dosing sleeve 30.

The piston rod 70 may include an external thread 71, with which the piston rod 70 may be screwed into the internal thread 21 of the inner housing sleeve 20. As may best be seen in FIG. 4, the piston rod 70 may include two grooves 72 offset by 180° in the circumferential direction, which may extend over the entire axial length of the piston rod 70. In the assembled state, the webs 51 of the coupling sleeve 50 may engage in these grooves, whereby the coupling sleeve 50 may be coupled rotationally but displaceable relative to the piston rod 70.

At the distal end of the piston rod 70 a button-shaped termination of the piston rod 70 (FIG. 2) may be formed, which may allow a snap connection to a flange 73, whereby the flange 73 may be rotatable relative to the piston rod 70, but may be held on the piston rod 70 in an axially non-displaceable manner. The flange 73 may act on a stopper in the cartridge 13 to dispense the medicinal substance from the cartridge 13.

In FIG. 2, the injector 1 is shown in a longitudinal section in an initial position. To set a dose, the dosing sleeve 30 may be rotated at its handle 33 relative to the housing 10 in the setting direction relative to the housing 10. As the dosing sleeve 30 may be in a threaded engagement with the inner housing sleeve 20, the dosing sleeve 30 may thereby be unscrewed from the inner housing sleeve 20. The numerical scale printed on the dosing sleeve 30 may be visible through the apertures 16 in the outer housing sleeve 14 and may assist in setting the desired dose.

The coupling sleeve 50 may be blocked from rotation in the direction of adjustment by the ratchet arms 53, which engage the longitudinal grooves 22 of the inner housing sleeve 20 with their cams 54. Since the coupling sleeve 50 may be blocked, the piston rod 70, which is rotationally connected to it, may also be blocked.

If too high a dose is inadvertently set, the dose may be corrected by screwing the dosing sleeve 30 back into the housing 10. The coupling sleeve 50 may continue to be held rotationally relative to the housing 10 due to the force required to move the preloaded ratchet arms 53 of the coupling sleeve 50 out of the longitudinal grooves 22 of the inner housing sleeve 20 being greater than the frictional force between the dosing sleeve 30 and the coupling sleeve 50. Consequently, when a dose is set and corrected, if the dosing sleeve 30 is rotated in the setting direction or in the opposite direction, the coupling sleeve 50 and thus the piston rod 70 cannot rotate.

As the dosing sleeve 30 rotates relative to the coupling sleeve 50 when a dose is adjusted and corrected, the radial teeth 36 of the dosing sleeve 30 may slide over the teeth 58 of the click arms 57 of the coupling sleeve 50, thereby generating a clicking sound and vibration. Thus, acoustic as well as tactile feedback may be generated for the user in the direction of adjustment (increasing the dose) as well as in the opposite direction (reducing the dose).

When the dosing sleeve 30 is unscrewed from the inner housing sleeve 20 as well as when the dosing sleeve 30 is screwed into the inner housing sleeve 20, the axial teeth 59 of the coupling sleeve 50 may not engage with the axial teeth 34 of the dosing sleeve 30, whereby the dosing sleeve 30 and the coupling sleeve 50 may be rotated relative to each other.

The stop nut 40 may be guided axially movably and rotationally fixed in the axial grooves 32 of the dosing sleeve 30. The stop nut 40 may be rotated together with the dosing sleeve 30 when the dosing sleeve 30 is rotated, whereby the stop nut 40 may be screwed on the external thread 52 of the coupling sleeve 50 in the proximal direction. When correcting or turning back the dosing sleeve 30, the stop nut 40 may be correspondingly screwed again in the distal direction.

To dispense a set dose, the user may press the dispensing button 60 in the distal direction, which may cause the coupling sleeve 50 to shift in the distal direction relative to the dosing sleeve 30. The axial teeth 59 of the coupling sleeve 50 may be brought into engagement with the axial teeth 34 of the dosing sleeve 30 by this displacement, thereby rotationally coupling the coupling sleeve 50 to the dosing sleeve 30.

The distally acting force may screw the dosing sleeve 30 back into the housing 10. That is, when the biasing force of the ratchet arms 53 is overcome and the cams 54 slide out of the longitudinal grooves 22, the coupling sleeve 50 may be rotated relative to the housing 10. Since the coupling sleeve 50 may now be rotationally coupled to the dosing sleeve 30 and the dosing sleeve 30 may be in threaded engagement with that of the inner housing sleeve 20, the dosing sleeve 30 may begin to screw into the housing 10 with a screwing motion under the distally acting compressive force. The coupling sleeve 50 may also be rotated relative to the housing 10 by the rotating dosing sleeve 30. As a result, the piston rod 70, which may be rotationally connected to the coupling sleeve 50 may also be rotated, which may thereby result in the piston rod screwing distally into the internal thread 21 of the inner housing sleeve 20. Thus, the flange 73 at the distal end of the piston rod 70 may be axially displaced relative to the housing 10 and may distally displace the stopper, which may be located in the cartridge 13. As a result, the medicinal substance may be discharged from the cartridge 13.

The flexible ratchet arms 53 of the coupling sleeve 50 may be moved over the longitudinal grooves 22 as the coupling sleeve 50 rotates, producing a clicking sound and vibration. Due to the rounded area 55, the ratchet arms 53 may only be moved over the longitudinal grooves 22 in the discharge direction. In the opposite direction, the end faces 56 of the cams 54 abut the flanks of the longitudinal grooves 22 and may thus prevent rotation of the coupling sleeve 50. As a result, the piston rod 70, which may be rotationally connected to the coupling sleeve 50, can only be moved in the dispensing direction.

As mentioned, there may be no relative movement between the coupling sleeve 50 and the dosing sleeve 30 when the dose is dispensed due to the rotational coupling. As a result, the stop nut 40 may be rotated as well, but the stop not 40 may not be displaced relative to the coupling sleeve 50. That is, the stop nut 40 may not be moved on the external thread 52 in a distal or proximal direction during dose dispensing. Thus, the stop nut 40 may only ever be moved relative to the coupling sleeve 50 and the dosing sleeve 30 during dose adjustment or correction. The thread pitch and dimension of the stop nut 40 may be such that the stop nut 40 abuts the coupling sleeve 50 with a stop at the proximal end of the external thread 52 when the maximum dose, such as the total dose that can be dispensed, has been set. This may ensure that while the user can set and dispense a dose multiple times, a dose cannot be set that exceeds the capacity of the cartridge 13 or any other dose total.

Figure 6:
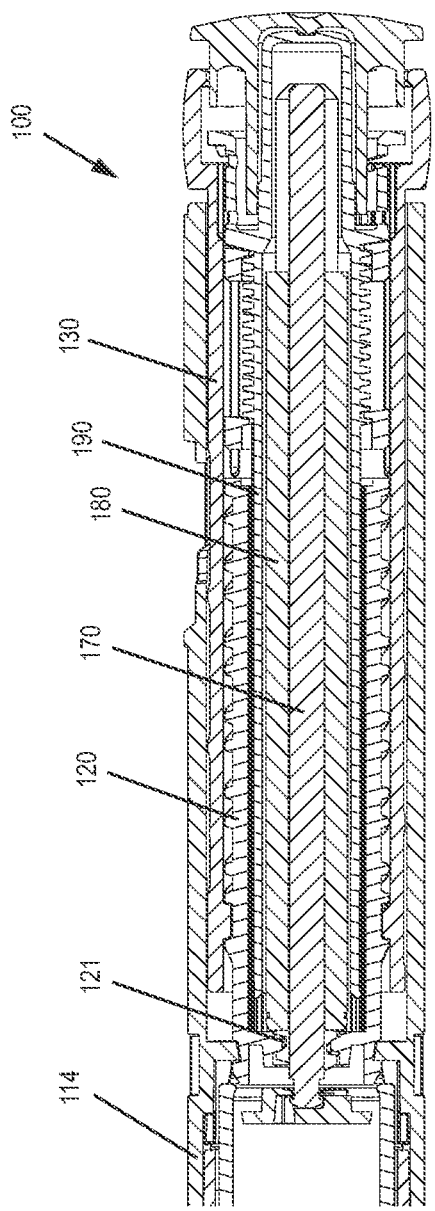
FIG. 6 shows a second implementation of the injector in a cross-sectional view in an initial position.
Figure 7:
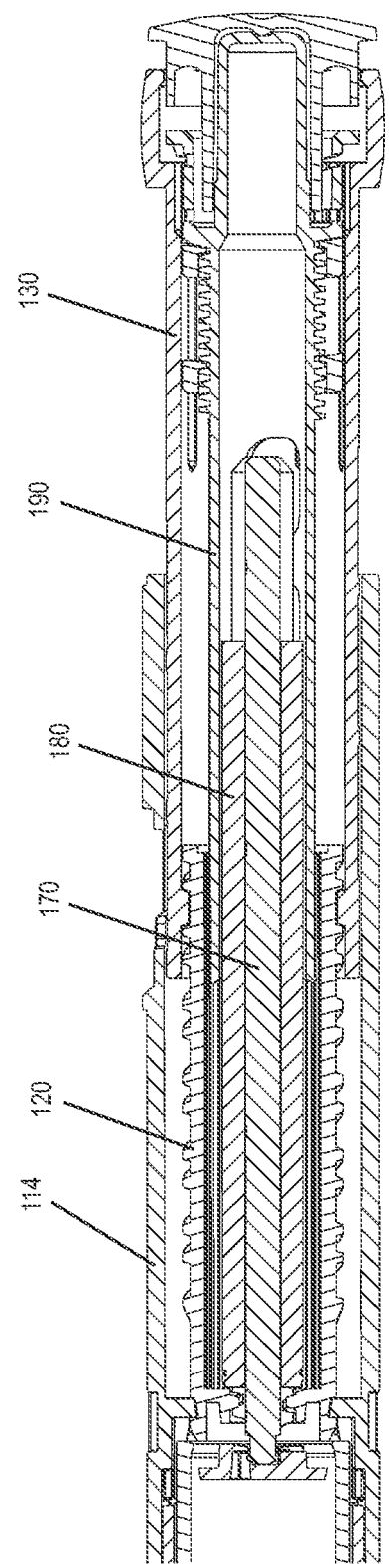
FIG. 7 shows the second implementation of the injector of FIG. 6 after a dose has been set.

FIGS. 6 and 7 illustrate another implementation of the injection device 100 according to the present disclosure, in which a dose setting and dispensing mechanism in which the coupling sleeve is formed in two parts. In contrast to the implementation described in connection with FIGS. 1-5, the coupling sleeve may include an inner coupling sleeve 180 and an outer coupling sleeve 190. The outer coupling sleeve 190 may include the previously-described threads for the stop nut, the click arms, the ratchet arms and the teeth for coupling with the dosing sleeve 130. Internally, the outer coupling sleeve 190 may include axial grooves in which webs of the inner coupling sleeve 180 may be guided so that the inner and outer coupling sleeves 180, 190 are rotationally coupled but movable relative to each other in the direction of the longitudinal axis.

The inner coupling sleeve 180 may be rotationally coupled but displaceable in the direction of the longitudinal axis on the piston rod 170. For this purpose, the inner coupling sleeve 180 may include axial webs which engage in axial grooves in the piston rod 170 as described above. In addition, the inner coupling sleeve 180 may be held axially on the outer or inner housing sleeve 114, 120 by means of a flange (not shown) so that the inner coupling sleeve 180 it is rotatable relative to the housing.

When setting a dose, the outer coupling sleeve 190 may be displaced proximally out of the housing by the dosing sleeve 130 but not rotated, as described previously in connection with the first implementation. In FIG. 7, the injection device 100 is shown prior to dispensing a set dose. The inner and outer coupling sleeves 180, 190 may not be rotated during the setting and correction of a dose. In addition, the inner coupling sleeve 180 may not be moved axially. As a result, the outer coupling sleeve 190 may be displaced relative to the inner coupling sleeve 180. The two coupling sleeves 180, 190 may remain rotationally coupled.

When a set dose is dispensed, the outer coupling sleeve 190 may be rotationally coupled to the dosing sleeve 130, as mentioned in the first implementation. Due to the now rotating outer coupling sleeve 190, the inner coupling sleeve 180 may also rotate and thus may drive the piston rod 170. The threads of the piston rod 170 may rotate through the internal thread 121 in the inner housing sleeve 120, moving the flange of the piston rod 170 distally and allowing the medical substance to be dispensed from the cartridge.

In another implementation of the dosing and dispensing mechanism according to the present disclosure, the acoustic and/or tactile signal when setting and correcting a dose may be implemented differently than described in the first implementation. For example, instead of the axial teeth 58 of the coupling sleeve and the axial teeth 34 of the dosing sleeve generating an acoustic and/or tactile signal, a click disc with teeth and with a corresponding flange on the dosing sleeve and coupling sleeve may be provided as described in the first implementation of European patent application EP 19163197.7 on pages 15-24 and illustrated in FIGS. 10 and 11. Furthermore, the acoustic and/or tactile signal generated during dose adjustment and correction may be provided by means of an annular click disc as disclosed in European patent application EP 19163197.7 on page 24, line 32—page 25, line 29 in connection with FIGS. 12-14. However, the click disc may also be designed as a click ring according to FIGS. 15-17 and the corresponding description on page 25, line 30—page 27, line 18 of European patent application EP 19163197.7.

Further, instead of the stop nut 40, which may ensure that no dose can be set which exceeds the capacity of the cartridge, an alternative limiting mechanism may be provided. As a result, instead of the stop nut, the external thread 52 of the coupling sleeve, the grooves 32 in the dosing sleeve, the dosing and dispensing mechanism according to the present disclosure may comprise a limiting mechanism between the dosing sleeve 30 and the coupling sleeve 50 with eccentric elements as described in European patent application EP 2 918 298 A1 in paragraphs [0059-0138] and FIGS. 1 to 25b.

In another implementation, instead of the stop nut, a ball with corresponding guideways may be provided in the coupling sleeve and in the dosing sleeve, as described in PCT patent application WO 2010/149209 A1 on pages 25-27 and shown in FIGS. 3-8. Alternatively, a segment guided in longitudinal guides can be used instead of the ball as disclosed in PCT patent application WO 2010/149209 A1 on pages 27-29 and FIGS. 9-14.

The disclosures of EP 19163197.7 published as EP 3708206 A1, EP 2 918 298 A1 and WO 2010/149209 A1 are hereby incorporated herein in their entireties for any purpose.

LIST OF REFERENCES

| | |
|---|---|
| 1, 100 | Injector |
| 10 | Housing |
| 11 | Protective cap |
| 12, 120 | Cartridge holder |
| 13 | Cartridge |
| 14, 114 | Outer housing sleeve |
| 16 | Opening |
| 17 | Ribs |
| 20, 120 | Inner housing sleeve |
| 21, 121 | Internal thread |
| 22 | Longitudinal grooves |
| 23 | External thread |
| 24 | Distal web or shoulder |
| 25 | Proximal web or shoulder |
| 30, 130 | Dosing sleeve |
| 31 | Internal thread |
| 32 | Grooves |
| 33 | Handle |
| 34 | Axial teeth |
| 35 | Bead |
| 36 | Radial teeth |
| 40 | Stop nut |
| 41 | Webs |
| 50 | Coupling sleeve |
| 51 | Webs |
| 52 | External thread |
| 53 | Ratchet arms |
| 54 | Cam |
| 55 | Rounded area |
| 56 | End face |
| 57 | Click arms |
| 58 | Tooth |
| 59 | Axial teeth |
| 60 | Dispensing button |
| 61 | Webs |
| 70, 170 | Piston rod |
| 71 | External thread |
| 72 | Grooves |
| 73 | Flange |
| 180 | Inner coupling sleeve |
| 190 | Outer coupling sleeve |

What is claimed is:

1. An injection device for dispensing a dose of a product by manually advancing a piston rod into a cartridge held in the injection device, the injection device comprising a dosing and dispensing mechanism comprising:

a housing having a longitudinal axis;

a dosing sleeve at least partially arranged in the housing for dose setting and dose correcting;

a housing insert axially and rotationally fixed relative to the housing and at least partially arranged within an interior of the dosing sleeve; and a coupling sleeve at least partially arranged within the housing for driving the piston rod, wherein for the dose setting and dose correcting, the dosing sleeve is rotatable relative to the coupling sleeve, and for dispensing the dose, the dosing sleeve is coupleable to the coupling sleeve and rotatably fixed relative thereto, and wherein the coupling sleeve comprises an external surface with a locking element extending therefrom, the locking element defining an elastic radial arm configured to engage with a plurality of axial grooves on an external surface of the housing insert facing the external surface of the coupling sleeve such that the coupling sleeve and the elastic radial arm are rotatable relative to the housing insert in a first direction of rotation and are prevented from rotation in an opposite, second direction of rotation by an engagement of the elastic radial arm within one of the plurality of axial grooves of the housing insert.

2. The injection device according to claim 1, wherein the elastic radial arm is arranged in a lateral surface of the coupling sleeve.

3. The injection device according to claim 1, wherein the housing insert comprises an external thread, and wherein the dosing sleeve is in a threaded engagement with the external thread of the housing insert.

4. The injection device according to claim 1, wherein the coupling sleeve comprises an elastic click element coupleable with the dosing sleeve for generating an acoustic and/or tactile signal during dose setting and dose correcting in the first direction of rotation and the second direction of rotation.

5. The injection device according to claim 1, wherein the coupling sleeve is rotationally fixed relative to and displaceably mounted on the piston rod.

6. The injection device according to claim 5, wherein the coupling sleeve comprises an internal axial web and the piston rod comprises an external axial groove engagable in the axial web.

7. The injection device according to claim 1, wherein the coupling sleeve comprises a first part cooperable with the piston rod and a second part coupleable to the dosing sleeve, wherein the first part and the second part are axially displaceable and rotationally fixed relative to one another.

8. The injection device according to claim 7, wherein the first part is rotationally fixed relative to the piston rod, and wherein the second part is sleeve-shaped and surrounds the first part.

9. The injection device according to claim 1, wherein the locking element is formed as one of a pawl element or a counter-pawl element and the housing insert comprises the other of the pawl element or the counter-pawl element, wherein the pawl element and the counter-pawl element form a ratchet such that the coupling sleeve is rotatable relative to the housing insert in a dispensing direction and is non-rotatable in an opposite direction.

10. The injection device according to claim 1, wherein the external surface of the coupling sleeve with the locking element extending therefrom is an outwardly facing external surface, and the external surface of the housing insert with the plurality of axial grooves is an inwardly facing external surface.

11. The injection device according to claim 1, wherein the elastic radial arm and the plurality of axial grooves form a ratchet such that the coupling sleeve is rotatable relative to the housing insert in the first direction corresponding to a dispensing direction, the ratchet producing a clicking sound or a vibration during such rotation in the first direction.

12. The injection device according to claim 1, wherein the coupling sleeve comprises an external thread configured to engage with a stop nut, wherein the dosing sleeve comprises axial grooves configured to rotationally fix the stop nut, and wherein the stop nut is configured to abut a stop at proximal end of the external thread when a total dose that can be dispensed is reached.

13. A dosing and dispensing mechanism for an injection device for dispensing a dose of a product by advancing a piston rod, the dosing and dispensing mechanism comprising:
a housing having a longitudinal axis;
a dosing sleeve at least partially arranged in the housing for dose setting and dose correcting;
a housing insert axially and rotationally fixed relative to the housing and at least partially arranged within an interior of the dosing sleeve; and
a coupling sleeve at least partially arranged within the housing for driving the piston rod,
wherein for the dose setting and dose correcting, the dosing sleeve is rotatable relative to the coupling sleeve in a first direction and in an opposite, second direction, and for dispensing the dose, the dosing sleeve is coupleable to the coupling sleeve and rotatably fixed relative thereto, and
wherein the coupling sleeve comprises an external surface with a locking element extending therefrom, the locking element defining an elastic radial arm configured to engage with a plurality of axial grooves on an external surface of the housing insert facing the external surface of the coupling sleeve such that the coupling sleeve and the elastic radial arm are rotatable relative to the housing insert in the first direction of rotation and are prevented from rotation the second direction of rotation by an engagement of the elastic radial arm within one of the plurality of axial grooves of the housing insert.

14. The dosing and dispensing mechanism according to claim 13, wherein the elastic radial arm and the plurality of axial grooves form a ratchet such that the coupling sleeve is rotatable relative to the housing insert in the first direction corresponding to a dispensing direction, the ratchet producing a clicking sound or a vibration during such rotation in the first direction.

15. The dosing and dispensing mechanism according to claim 14, wherein the coupling sleeve is rotationally fixed relative to and displaceably mounted on the piston rod.

16. The injection device according to claim 15, wherein the elastic radial arm is arranged in a lateral surface of the coupling sleeve.

17. The dosing and dispensing mechanism according to claim 13, wherein the housing insert comprises an external thread, and wherein the dosing sleeve is in a threaded engagement with the external thread of the housing insert.

18. A dosing and dispensing mechanism for an injection device for dispensing a dose of a product by advancing a piston rod, the dosing and dispensing mechanism comprising:
a housing having a longitudinal axis;
a dosing sleeve at least partially arranged in the housing for dose setting and dose correcting;
a housing insert axially and rotationally fixed relative to the housing and at least partially arranged within an interior of the dosing sleeve; and
a coupling sleeve at least partially arranged within the housing for driving the piston rod,
wherein for the dose setting and dose correcting, the dosing sleeve is rotatable relative to the coupling sleeve in a first direction and in an opposite, second direction, and for dose dispensing, the dosing sleeve is coupleable to the coupling sleeve and rotatably fixed relative thereto,
wherein the coupling sleeve comprises an external surface with a locking element extending therefrom, the locking element defining an elastic radial arm configured to engage with a plurality of axial grooves on an external surface of the housing insert facing the external surface of the coupling sleeve such that the coupling sleeve and the elastic radial arm are rotatable relative to the housing insert in the first direction of rotation and are prevented from rotation in the second direction of rotation by an engagement of the elastic radial arm within one of the plurality of axial grooves of the housing insert, and wherein the coupling sleeve is rotationally fixed relative to and displaceably mounted on the piston rod such that rotation of the coupling sleeve during the dose dispensing causes the piston rod to rotate to thereby advance and dispense the dose.

19. The injection device according to claim 18, wherein the elastic radial arm is arranged in a lateral surface of the coupling sleeve.

20. The injection device according to claim 18, wherein the coupling sleeve comprises an internal axial web and the piston rod comprises an external axial groove engagable in the axial web.

\* \* \* \* \*